(12) United States Patent
Ryder et al.

(10) Patent No.: US 8,024,461 B1
(45) Date of Patent: Sep. 20, 2011

(54) COMMUNICATION ASSETS SURVEY AND MAPPING TOOL

(75) Inventors: Robert J. Ryder, San Diego, CA (US); Scott T. Evans, Alpine, CA (US); Eric I. Jensen, Chula Vista, CA (US); Alice Moore, San Diego, CA (US); Alan O. Peterson, La Mesa, CA (US); Robert S. Drew, San Diego, CA (US); Walter M. Seay, Poway, CA (US); Kathy Seay, Poway, CA (US); Jeffrey B. Lee, Lakeside, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 249 days.

(21) Appl. No.: 12/365,540

(22) Filed: Feb. 4, 2009

Related U.S. Application Data

(63) Continuation-in-part of application No. 11/452,565, filed on Jun. 5, 2006, and a continuation-in-part of application No. 11/449,178, filed on May 16, 2006.

(51) Int. Cl.
*G06F 15/173* (2006.01)
(52) U.S. Cl. ........................ 709/224; 709/223
(58) Field of Classification Search .......... 709/223, 709/224
See application file for complete search history.

(56) References Cited

U.S. PATENT DOCUMENTS

| 5,584,025 | A | * | 12/1996 | Keithley et al. ............. 707/752 |
| 6,216,130 | B1 | | 4/2001 | Hougaard |
| 2004/0070515 | A1 | | 4/2004 | Burkley |
| 2004/0120857 | A1 | | 6/2004 | Smith et al. |
| 2005/0034075 | A1 | | 2/2005 | Riegelman et al. |
| 2006/0080344 | A1 | | 4/2006 | McKibben |
| 2008/0004904 | A1 | | 1/2008 | Tran |
| 2008/0037461 | A1 | | 2/2008 | Biltz et al. |
| 2008/0274761 | A1 | | 11/2008 | Block et al. |
| 2010/0114493 | A1 | * | 5/2010 | Vestal ............................. 702/9 |
| 2010/0149335 | A1 | * | 6/2010 | Miller, II ...................... 348/148 |
| 2010/0250312 | A1 | * | 9/2010 | Tarabzouni et al. ............ 705/7 |
| 2010/0257452 | A1 | * | 10/2010 | Peterson ...................... 715/736 |

OTHER PUBLICATIONS

USPTO Office Action, mailed Jan. 21, 2009, for unpublished U.S. Appl. No. 11/452,565, filed Jun. 5, 2006 by Rita Lane et al.

* cited by examiner

*Primary Examiner* — Mohamed Wasel
(74) *Attorney, Agent, or Firm* — Kyle Eppele; Stephen E. Baldwin

(57) ABSTRACT

A Communication Assets Survey and Mapping Tool. The method includes collecting and storing agency, communication asset and interoperability data in a database, receiving a request for a display of agency, communication asset and interoperability of a geographic area, retrieving data regarding agency, communication asset and interoperability information from the database, determining interoperability between agencies based on their communication assets data and displaying interoperability information. Features include prioritizing interoperability solutions (a need vs ability analysis), data entry graphical user interface, data export, and community forum.

11 Claims, 13 Drawing Sheets

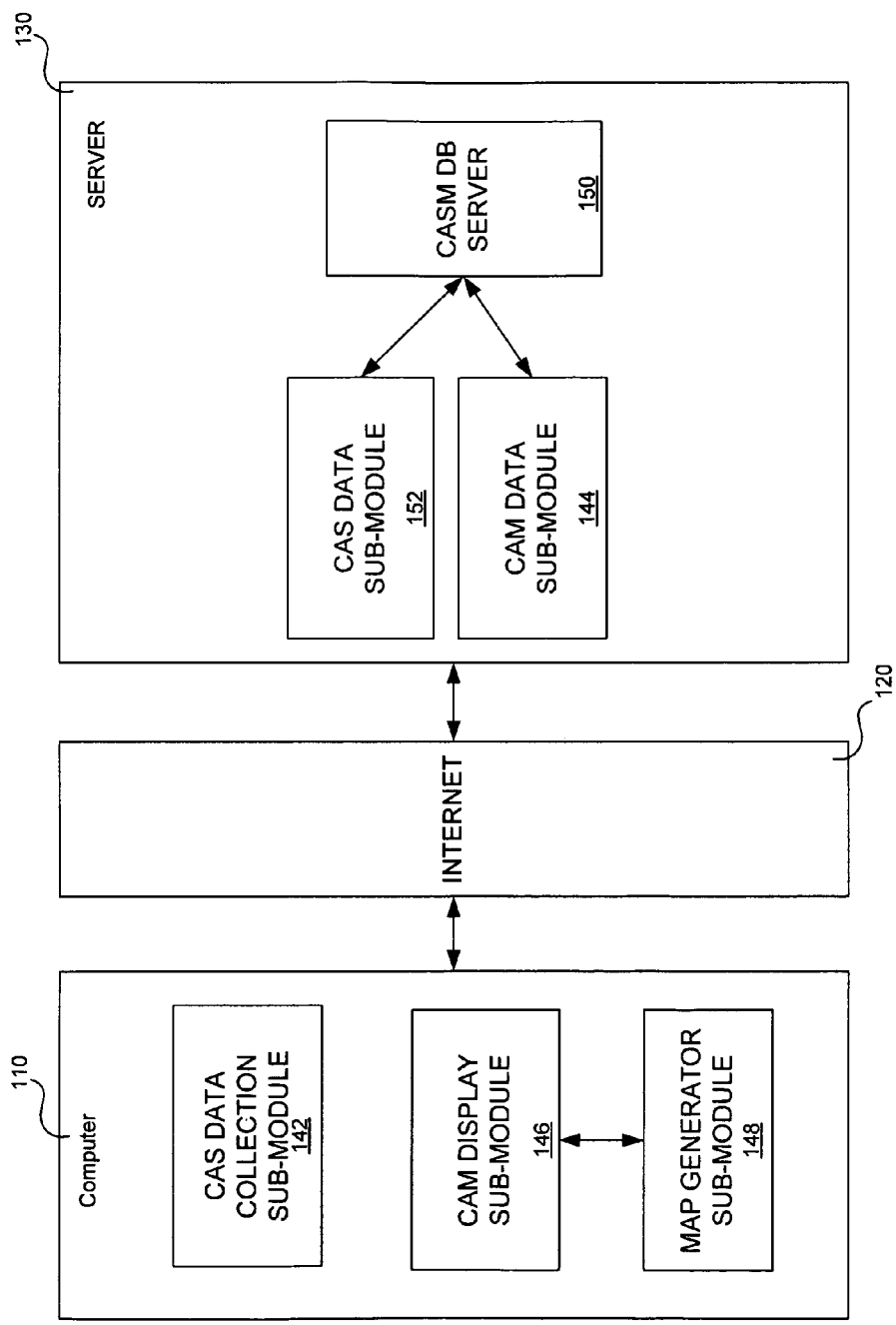

1. Agency Talk Partners

How often do your agency(s) need to talk to other agencies in your state/urban area on a day-to-day basis?

Instructions: Select an agency from the Select Agency option below. It is from this agency's perspective that you will identify the other agencies with whom it needs to communicate. Once you select a jurisdiction from the Select Jurisdiction list, a table will be populated with all agencies in the selected jurisdiction. Indicate in the table how often the selected agency needs to communicate with the agencies in the list, then click Save.

⊙ Alphabetical by Agency  ○ Jurisdiction Hierarchy

*Select Agency: Carson City Police
*Select Jurisdiction: California - All Agencies Sort table by: Alphabetical by Agency Name Carson City Police needs to communicate with... ☐ Don't show Undecided/Unknown.

| Agency Name | Daily/Often | Some-times | Rarely/Never | Undecided/Unknown |
|---|---|---|---|---|
| California Highway Patrol | ○ | ○ | ⊙ | ○ |
| Cameron Park Police | ○ | ○ | ⊙ | ○ |
| Dollar Point Police Dept. | ○ | ○ | ⊙ | ○ |
| Kings Beach Fire | ○ | ⊙ | ○ | ○ |
| Kings Beach Police | ○ | ⊙ | ○ | ○ |

[RESET]

FIGURE 7

CASM Agency Need Analysis Report

Print Report

CASM Agency Need Analysis Report
For Official Use Only

Selected Agency: Alpine Meadows PD
State/Urban Area: Lake Tahoe
Report Generated: 20-Jan-2009

AGENCY NEED ANALYSIS INFORMATION:

The following table identifies agencies that the selected agency needs to talk to and agencies that need to talk to the selected agency when there is a discrepancy between the need designations.

| Agency Name | Need Designation (made by the selected agency) | Need Designation (made by the agency in row) |
|---|---|---|
| Carson City Comms Dept. | Sometimes | Undecided/Unknown |
| Carson City Department of Health | Sometimes | Undecided/Unknown |
| Carson City EMS | Sometimes | Undecided/Unknown |
| Dagget Pass Police | Sometimes | Undecided/Unknown |
| Douglas County Sheriff | Sometimes | Undecided/Unknown |
| Genoa Fire | Sometimes | Undecided/Unknown |
| Genoa Police | Sometimes | Undecided/Unknown |
| Loomis Police | Rarely/Never | Undecided/Unknown |
| Topaz Lake Fire | Rarely/Never | Undecided/Unknown |

For Official Use Only

FIGURE 8

| | |
|---|---|
| ▶Radio System | Add / Edit Radio System |
| POC Information | Assign the Radio System Name |
| System Usage | Naming Convention: Enter the common name for the radio system, or combine the name of the Agency/Organization primarily responsible for the radio system with the frequency band it utilizes. Choose a name that others will recognize. Examples:<br>MyCountry 800 MHZ Trunked, TriCity UHF System |
| FCC Import | |
| Channels | |
| Channel Usage | |
| Talk Groups | *Radio System Name [Alameda-Alameda County NPSPAC 800 MHZ Trunke] |
| Talk Group Usage | Identify the Owning/Responsible Agency for this Radio System |
| Structures | ⊙ Alphabetical by Agency  ○ Jurisdiction Hierarchy<br>*Select Owner / Responsible Agency:<br>[Alameda County GSA ▼] |
| Repeater/Base Stations | |
| Data Entry Summary | *This agency uses this System as the:  ⊙ Primary System  ○ Secondary / Backup System |
| ☐ Feedback | Number of Mobile Radios the Agency uses on this System: [   ] |
| ⑦ Get Help | Number of Portable Radios the Agency uses on this System: [   ] |
| Close Window | Notes on your Agency's Use of this Radio System:<br>[                         ] |

Radio System Definitions

Primary Make (Mfg): [Motorola ▼]
System Type:      ⊙ Trunked   ○ Conventional   ○ Both
If "Trunked":    [Smart Net II+ ▼]
Model Name:    [Smart Net 2i]  *Frequency Band [800 (9806/851-824/809 MHz)]
*P25 Compliancy: [None ▼]      Number of Channels: [21]
Encryption Protocol: [None ▼]   Year Installed: [1992 ▼]

Repeated or Simplex?   ⊙ Repeated   ○ Simplex      ○ Both
Analog or Digital?     ⊙ Analog     ○ Digital      ○ Both
Wideband/Narrowband?   ○ Wideband   ⊙ Narrowband   ○ Both
Voted?                 ⊙ Yes   ○ No
Simulcast?             ⊙ Yes   ○ No Service Area of Radio System ( Counties and/ or Cities ):
[All the Cities and the County of Alameda County.]
Notes on this Radio System:
[                                                  ]

Latitude / Longitude Data:
[Show Data Fields]
*Required Field                          [RESET]    [SAVE]

FIGURE 10

| FIGURE 10A |
|---|
| FIGURE 10B |

FIGURE 10A

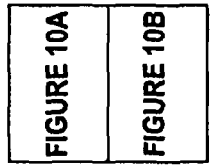 CASM Forums

← Board index                                                                 🔍 Search... [Search]
                                                                              Advanced search 👤 User Control Panel (0 new messages ) • View your posts      👥 Members  ⏻ Logout [ ejensen ]   ˅A˄

It is currently 07 Jan 2009 08:39                              Last visit was: 18 Nov 2008 09:31
[ Moderator Control Panel ]

View unanswered posts • View new posts • View active today                                 Mark forms read

| CASM GENERAL | TOPICS | POSTS | LAST POSTS |
|---|---|---|---|
| 🔘 Announcements<br>Announcements are posted here. This is a read-only forum | 2 | 2 | by mooreali 🗋<br>on 18 Mar 2008 13:25 |
| 🔘 Frequently Asked Questions (FAQ)<br>The most commonly asked questions answered here. This is a read-only forum. | 4 | 4 | by mooreali 🗋<br>on 20 Mar 2008 20:45 |
| 🔘 Training<br>Information about training is posted here. This is a read-only forum. | 2 | 2 | by mooreali 🗋<br>on 02 Sep 2008 09:04 |
| 🔘 General Help<br>Ask your questions here. | 1 | 2 | by rdrew 🗋<br>on 21 Aug 2008 12:53 |

Continued from FIGURE 10A

| | | TOPICS | POSTS | LAST POSTS |
|---|---|---|---|---|
| | Overall CASM Enhancements<br>Describe features you would like to see included in future CASM releases. | 4 | 6 | by rdrew<br>on 17 Nov 2008 17:16 |
| | CASM Usage<br>Share your ideas on how you use CASM. | 2 | 4 | by blarel<br>on 30 Sep 2008 11:07 |
| | Software Bugs<br>Report errors or unusual software behavior. | 3 | 4 | by mooreali<br>on 28 Aug 2008 14:07 |
| | Documentation<br>Please describe any discrepancies in the CASM documentation here. | 0 | 0 | No posts |

| FORUM | | TOPICS | POSTS | LAST POSTS |
|---|---|---|---|---|
| | Indiana | 0 | 0 | No posts |
| | Lake Tahoe | 1 | 1 | by smithjo<br>on Feb 2008 09:44 |
| | Crater Lake - demo use | 0 | 0 | No posts |
| | Ohio | 1 | 1 | by swaneym<br>on 11 Mar 2008 03:50 |
| | National Capital Region | 1 | 1 | by paulettem<br>on Nov 2008 12:18 |
| | Michigan | 0 | 0 | No posts |

COMMUNICATION ASSETS SURVEY AND MAPPING TOOL

CROSS-REFERENCE TO RELATED APPLICATIONS

This application is a continuation-in-part of U.S. Applications No. 11/452,565, filed Jun. 5, 2006 and No. 11/449,178, filed May 16, 2006, both entitled "Communication Assets Survey and Mapping Tool", both of which are hereby incorporated by reference herein in their entireties for their teachings, and referred to hereafter as "the parent applications."

FEDERALLY SPONSORED RESEARCH AND DEVELOPMENT

This invention is assigned to the United States Government and is available for licensing for commercial purposes. Licensing and technical inquiries may be directed to the Office of Research and Technical Applications, Space and Naval Warfare Systems Center, Pacific, Code 2112, San Diego, Calif., 92152; voice (619) 553-2778; email T2@spawar.navy.mil.

BACKGROUND

The Communication Assets Survey and Mapping Tool is generally in the field of public safety. Frequently, local, state and federal emergency and first responder communication assets are not interoperable. For example, a county fire department may not be able to communicate with a police department of an adjacent county.

A need exists for tools to help improve interoperability of emergency and first responder communication assets between local, state and federal entities.

BRIEF DESCRIPTION OF THE DRAWINGS

FIG. 1C is a block diagram of one embodiment of a communication assets survey and mapping tool.

FIGS. 4-7 show diagrams illustrating a need vs analysis feature.

FIG. 8 shows an add/edit feature.

FIG. 10, which includes FIGS. 10A AND 10B, shows a forum feature.

DETAILED DESCRIPTION

Described herein is Communication Assets Survey and Mapping Tool.

Definitions

The following acronyms are used herein:
Acronym(s):
CAM—Communication Assets Mapping
CAS—Communication Assets Survey
CASM—Communication Assets Survey and Mapping
DB—Database
DSM—Display Sub-Module
ISP—Internet Service Provider The Communication Assets Survey and Mapping (CASM) Tool includes a CASM Tool Module, which includes a communication assets mapping (CAM) display sub-module, a communication assets survey (CAS) data collection sub-module, a CAM data sub-module, a map generator sub-module and a CASM database (DB) server. The CASM Tool provides a method and apparatus for viewing interoperability of emergency and first responder communication assets between local, state and federal entities. The CASM Tool provides a mechanism for collecting communication assets data, determining interoperability between agencies based on communication assets and providing interoperability data to users. The CASM Tool provides access to geographically disparate users via the Internet and display of communications equipment and information in a geo-spatial referenced map to users via the Internet.

Figure 1A:
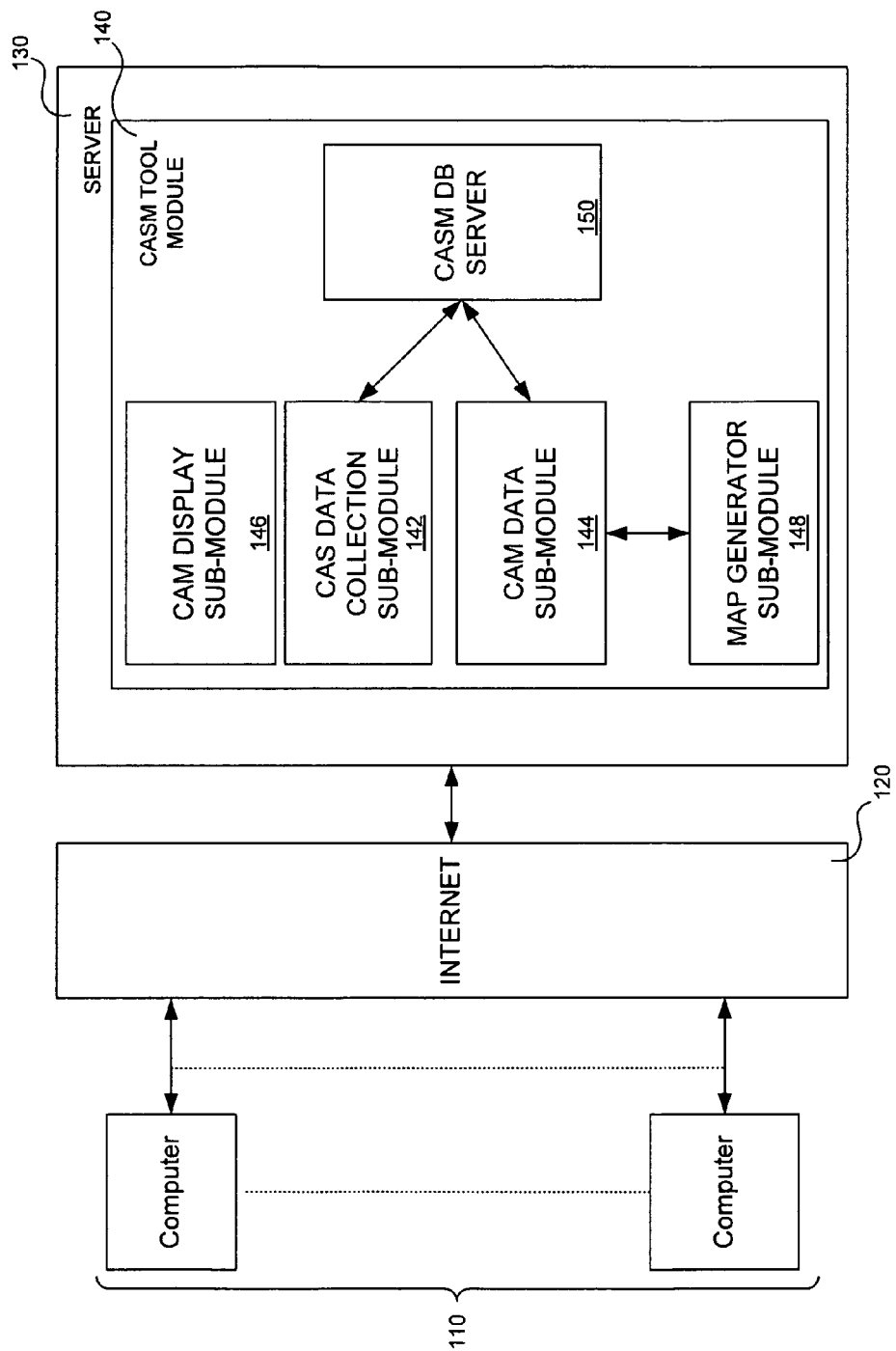
FIG. 1A is a block diagram of one embodiment of a communication assets survey and mapping tool.

FIG. 1A is a block diagram of one embodiment of a communication assets survey and mapping tool. As shown in FIG. 1A, CASM tool system 100 includes at least one computer 110, internet 120 and system server 130, which hosts CASM tool module 140. CASM tool module 140 includes CAM display sub-module 146, CAS data collection sub-module 142, CAM data sub-module 144, map generator sub-module 148 and CASM DB server 150. As shown in FIG. 1A, at least one computer 110 is operatively coupled to internet 120 so data can be transmitted between at least one computer 110 and internet 120. Internet 120 is operatively coupled to system server 130 so data can be transmitted between internet 120 and system server 130. At least one computer 110 and system server 130 can be operatively coupled to internet 120 in one of many configurations such as connection via an internet service provider (ISP).

As shown in FIG. 1A, CASM tool module 140 includes CAS data collection sub-module 142, CAM data sub-module 144, map generator sub-module 148, CASM DB server 150 and CAM display sub-module 146. CASM tool module 140 is operatively coupled to system server 130.

CAS data collection sub-module 142 is operatively coupled to CASM DB server 150. CAS data collection sub-module 142 includes computer programs capable of collecting communication asset data and interfacing with CASM DB server 150 for storing communication asset data, providing a mechanism for input, validation and viewing of state and urban area communications equipment data and providing forms, reports generation and retrieval/storage of data in CASM DB server 150.

CAM data sub-module 144 is operatively coupled to and provides an interface between CAM Display Sub-Module 146 and CASM DB Server 150. CAM data sub-module 144 includes computer programs capable of providing an interface between CAM display sub-module 146 and CASM DB Server 150 for the storage/retrieval of information regarding data sharing. For example, CAM display sub-module 146 includes an interface for storage/retrieval of Tactical Interoperable Communications Plan and other user files, which allows data sharing between region managers and their users.

Map generator sub-module 148 is operatively coupled to CAM data sub-module 144. Map generator sub-module 148 is capable of generating a customized map image to be shown to a user via CAM display sub-module 146 and at least one computer 110. In one embodiment, map generator sub-module 148 receives input from a user regarding custom map specifications. Map generator sub-module 148 can also generate a customized map image to CAS data collection sub-module 142.

CASM DB server 150 is operatively coupled to CAM data sub-module 144 and CAS data collection sub-module 142 so that data can be transmitted between all three. CASM DB server 150 is capable of being a central repository for all CASM data. CASM DB server is capable of being used as a storage/retrieval DB for other CASM components (e.g., CAS data collection sub-module 142).

CAM display sub-module 146 includes computer programs capable of receiving requests for a display of communication data and interoperability of a geographic area, retrieving communication data and interoperability information and transmitting data and interoperability information in a display format. In one embodiment, CAM display sub-module 146 uses CAM data sub-module 144 to obtain system data for a displayed region. In one embodiment, CAM display sub-module 146 uses data to calculate interoperability data for a selected region and formats the data to be displayed on a map obtained from map generator sub-module 148. In one embodiment, CAM display sub-module 146 allows a user to select all of the applicable data for a region or to select a subset of the data based upon display requirements.

Figure 1B:
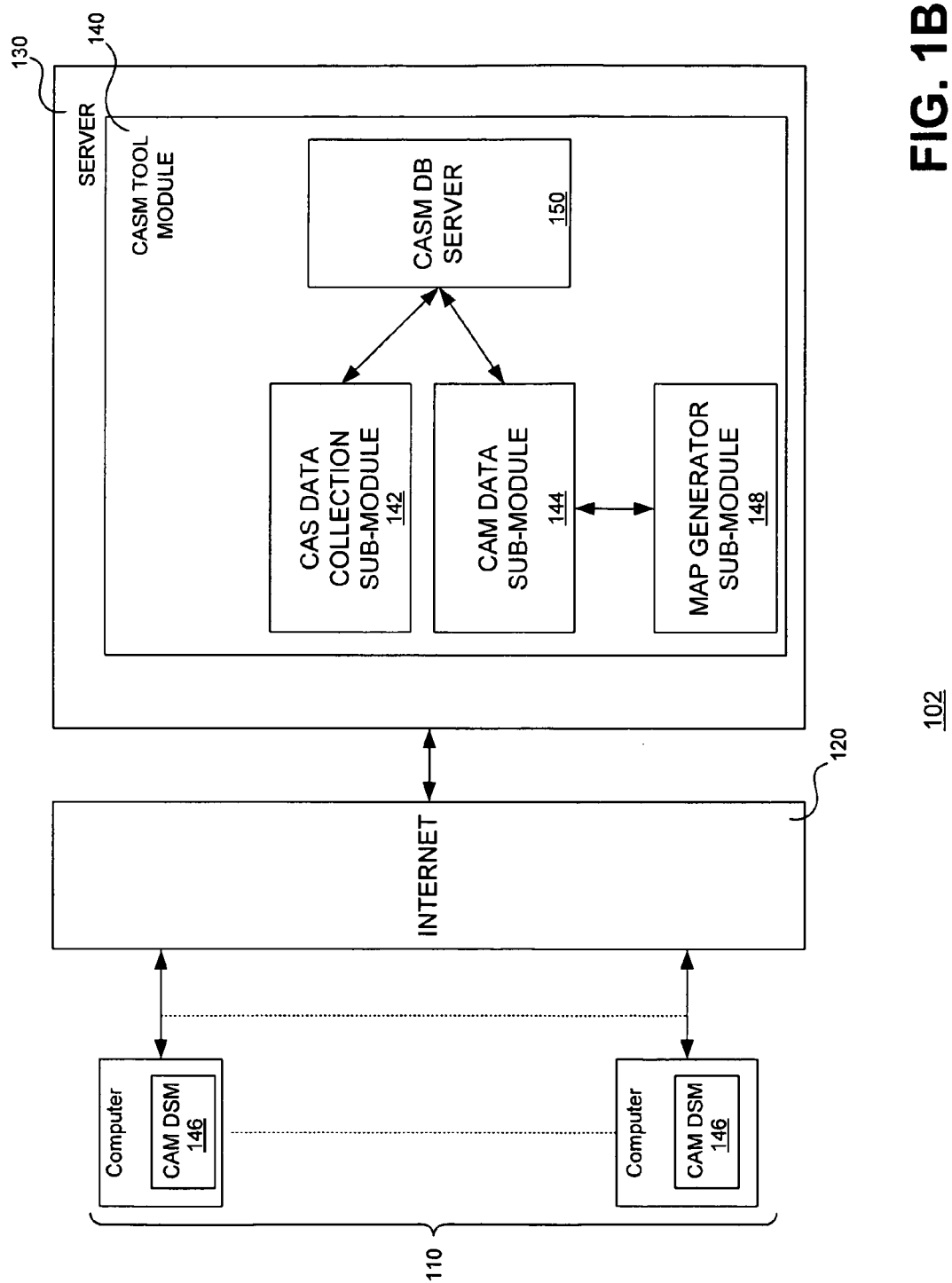
FIG. 1B is a block diagram of one embodiment of a communication assets survey and mapping tool.

FIG. 1B is a block diagram of one embodiment of a communication assets survey and mapping tool. FIG. 1B is substantially similar to FIG. 1A, and thus, similar components are not described hereinbelow. As shown in FIG. 1B, CASM tool system 102 includes at least one computer 110, internet 120 and system server 130, which hosts CASM tool module 140. CASM tool module 140 includes CAS data collection sub-module 142, CAM data sub-module 144, map generator sub-module 148 and CASM DB server 150. At least one computer 110 is operatively coupled to internet 120 so data can be transmitted between at least one computer 110 and internet 120. CAM display sub-module 146 is operatively coupled and resides on at least one computer 110.

FIG. 1C is a block diagram of one embodiment of a communication assets survey and mapping tool. FIG. 1C is substantially similar to FIG. 1A, and thus, similar components are not described hereinbelow. As shown in FIG. 1C, CASM tool system 104 includes at least one computer 110, internet 120, system server 130, CAS data collection sub-module 142, CAM data sub-module 144, CAM display sub-module 146, map generator sub-module 148, CASM DB server 150 and CAS data sub-module 152. System server 130 hosts CAM data sub-module 144, CASM DB server 150 and CAS data sub-module 152. CAS data sub-module 152 is capable of interfacing between CAS data collection sub-module 142 and CASM DB server 150. At least one computer 110 hosts CAS data collection sub-module 142, CAM display sub-module 146 and map generator sub-module 148.

Figure 2:
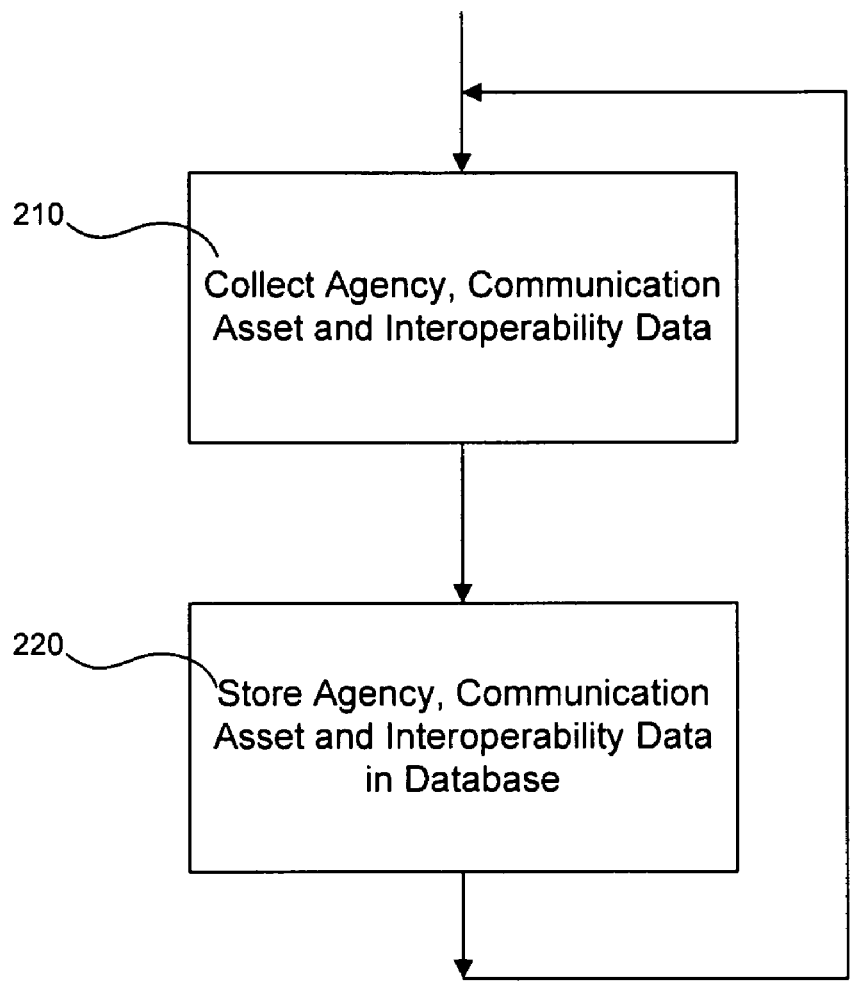
FIG. 2 is a flowchart of one embodiment of a method of a communication assets survey and mapping tool.

FIG. 2 is a flowchart of one embodiment of a method of a communication assets survey and mapping tool. Flowchart 200 of FIG. 2 is one embodiment of a method of CAS data collection sub-module 142 of FIG. 1A referred to as a CAS data collection sub-module method. Referring to FIG. 2, at BOX 210 of flowchart 200, the method collects agency, communication asset and interoperability data. In one embodiment, the method performs BOX 210 using software. After BOX 210, the method of flowchart 200 of FIG. 2 proceeds to BOX 220. At BOX 220 of flowchart 200, the method stores agency, communication asset and interoperability data in a database. In one embodiment, the method performs BOX 220 using software. After BOX 220, the method of flowchart 200 of FIG. 2 returns to BOX 210.

Figure 3:
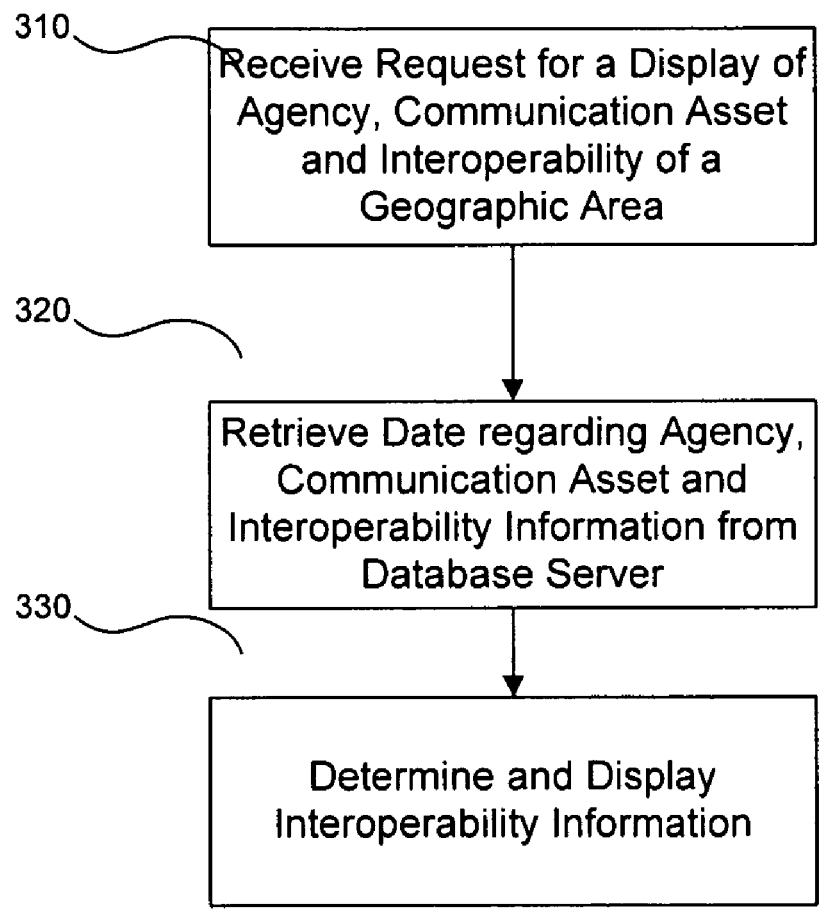
FIG. 3 is a flowchart of one embodiment of a method of a communication assets survey and mapping tool.

FIG. 3 is a flowchart of one embodiment of a method of a communication assets survey and mapping tool. Flowchart 300 of FIG. 3 is one embodiment of a method of CAM data sub-module 144 of FIG. 1A referred to as CAM display sub-module method. Referring to FIG. 3, at BOX 310 of flowchart 300, the method receives a request for a display of agency, communication asset and interoperability of a geographic area. In one embodiment, the method performs BOX 310 using software. After BOX 310, the method of flowchart 300 of FIG. 3 proceeds to BOX 320. At BOX 320 of flowchart 300, the method retrieves data regarding agency, communication asset and interoperability information from the database (e.g., CASM database server 150). In one embodiment, the method performs BOX 320 using software. After BOX 320, the method of flowchart 300 of FIG. 3 proceeds to BOX 330. At BOX 330 of flowchart 300, the method determines and displays interoperability information. In one embodiment, the method performs BOX 330 using software. In one embodiment, the method performs BOX 330 by determining interoperability between agencies based on their communication assets data. The method of flowchart 300 of FIG. 3 terminates at BOX 330.

The following describes an exemplary operation of CASM tool system 100 of FIG. 1A. As shown in FIG. 1A, CASM tool module 140 includes CAS data collection sub-module 142 and CAM display sub-module 144. A first user (e.g., San Diego City Police Chief) accesses CAS data collection sub-module 142 via one of at least one computer 110. CASM data collection sub-module 142 and one of at least one computer 110 are operatively coupled via system server 130 and internet 120. In accordance with BOX 210 of FIG. 2, CASM data collection sub-module method 200 collects agency, communication asset and interoperability data from the first user. For example, the user inputs equipment type and frequency usage data through CAS data collection sub-module 142. In accordance with BOX 220 of FIG. 2, CASM data collection sub-module method 200 stores interoperability data in CASM database server 150.

A second user (e.g., San Diego City Fire Chief) accesses CAS data collection sub-module 142 via one of at least one computer 110. The second user inputs agency, communication asset and interoperability data to CAS data collection sub-module 142 regarding the second user's communication assets. In accordance with BOX 210 of FIG. 2, CAS data collection sub-module method 200 collects agency, communication asset and interoperability data from the second user. In accordance with BOX 220 of FIG. 2, CASM data collection sub-module method 200 stores agency, communication asset and interoperability data in CASM database server 150.

If given access permission, a third user (e.g., Coast Guard Official) via one of at least one computer 110 accesses CAM display sub-module 146, which interfaces with CASM DB server 150 through CAM data sub-module 144. CAM data sub-module 144 and one of at least one computer 110 are operatively coupled via CAM display sub-module 146, system server 130 and internet 120. In accordance with BOX 310 of FIG. 3, CAM display sub-module method 300 receives a request from the third user for a display of interoperability of the San Diego geographic area. In accordance with BOX 320 of FIG. 3, CAM display sub-module method 300 retrieves San Diego area information regarding agency, communication asset and interoperability data from CASM database server 150 through CAM data sub-module 144. In accordance with BOX 330 of FIG. 3, CAM display sub-module method 300 determines interoperability data and transmits interoperability information in a display format to the third user.

FIGS. 4-7 show a need vs analysis feature, which provides communications planners with an ability to differentiate between agencies that have the ability to communicate versus those that actually "need" to communicate, thus a "Need vs Ability" feature. Identifying interoperability gaps can be achieved by comparing agencies' stated need to talk to each other on a day-to-day basis with their ability to talk based on interoperability calculated by CAM, and finding agency pairs that have the most need to talk, but have the least ability. This can be displayed on an interactive graph with printable graph interpretation and report. The need vs ability analysis compares agencies' need to talk versus their ability to talk, based on data entered into CAS. The visualization identifies agency pairs with the highest need and the least ability so that planners can prioritize interoperability solutions.

As shown in FIG. 4, agency talk partners enter tabular data indicating how often an agency(s) needs to talk to other agencies in a state/urban area on a day-to-day basis. This can be in a table showing entries based upon daily/often; sometimes; rarely/never; or undecided/unknown. For the example shown in FIG. 4, a user is asked how often an agency (s) need to talk to other agencies in the state/urban area on a day-to-day basis. In the example shown, the selected user agency is the Carson City Police, and the selected jurisdiction is California-All Agencies. The user in FIG. 4 makes entries into the tabular form, as described above.

In the example shown in FIG. 4, the partial table shows the Carson City Police communicating with the California Highway Patrol (Rarely/Never); Cameron Park Police (Rarely/Never); Dollar Point Police Dept (Rarely/Never); Kings Beach Fire (Sometimes); and Kings Beach Police (Sometimes). The remaining selected jurisdiction tabular date would be entered in the same manner in FIG. 4.

The need vs ability analysis also analyzes communications interoperability, which can be defined as the ability of public safety agencies to talk across disciplines and jurisdictions via radio communications systems, exchanging voice and/or data with one another on demand, in real time, when needed, and as authorized. Interoperability resources for this urban area are summarized below (and shown in FIG. 5):
No Interoperability: self defining.
Swap Radio Swapping radios refers to maintaining a cache of standby radios that can be deployed to support regional incidents. These radios may be from a regional cache, or from a participating agency. This allows all responders to use a common, compatible set of radios during an incident.
Shared Channel "Shared channels" refers to common frequencies or channels that have been established and are programmed into radios to provide interoperable communications among agencies. Specific shared interoperable communications channels available within the region are listed in the table below.
Gateway Gateway systems interconnect channels of different systems (whether on different bands or modes), allowing first responders to use their existing radios and channels to be interconnected with the channels of other users outside of their agency. Specific gateway systems available for use within the region are listed in the table below.
Shared Systems (Proprietary or Standards Based Systems) refers to the use of a single radio system infrastructure to provide service to multiple Public Safety agencies within a region.

Figure 5:
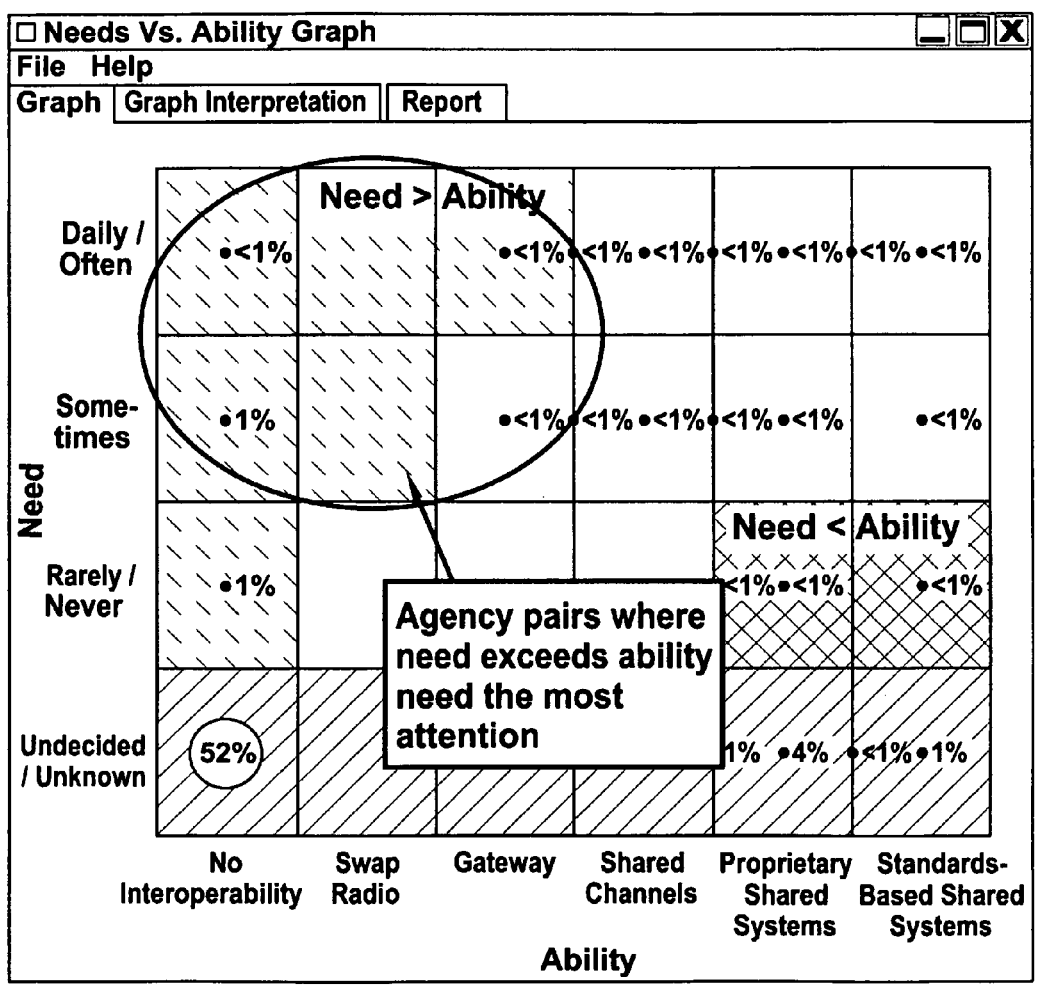

In FIGS. 4 and 5, the entry data indicates from an agency perspective the other agencies with whom it needs to communicate, and on what basis. Once selected, a table can be populated with all agencies in the selected jurisdiction.

The graph data shown in FIG. 5 shows a need versus ability CAM display which will allow for planners to prioritize interoperability solutions, by identifying agency pairs with the highest need and the least ability, based on the data entered into CAM. In the example shown in FIG. 5, the circled portion shows agency pairs where need exceeds ability and needs the most attention.

Figure 6:
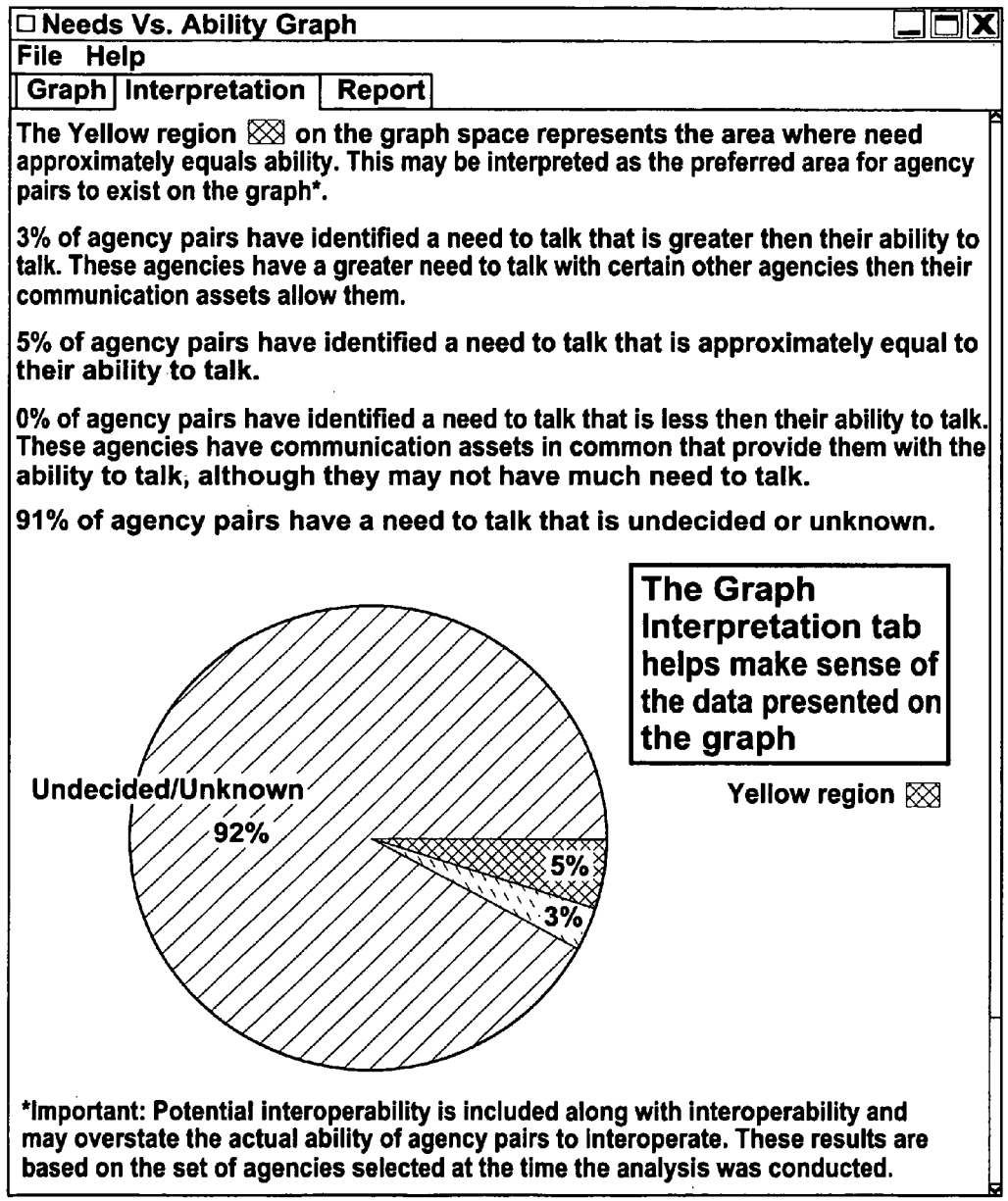

FIG. 6 shows a graph interpretation of FIG. 5 to further visualize the need vs ability feature, indicating, for example, agency pairs (3%) which have identified a need to talk that is greater than their ability to talk; agency pairs (5%) which have identified a need to talk which is approximately equal to their ability to talk: agency pairs (0%) which have identified a need to talk which is less than their ability to talk; and agency pairs (91%) which have a need to talk that is undecided or unknown. The yellow region on the graph space in FIG. 6 represents the area where need approximately equals ability, which may be interpreted as the preferred area for agency pairs on the graph of FIG. 6.

FIG. 7 shows a suitable Need/analysis Report which can be generated for a user of the CASM tool, showing, for example, agency need analysis information based upon need designation by selected agency and by an agency in a selected row of FIG. 4. In the example shown in FIG. 7, the generated report is for Alpine Meadows Police Department as the selected agency, in Lake Tahoe, Calif., indicating other agency names, with the need designation (made by the selected agency) and the need designation (made by the agency in row). For instance, the Loomis Police agency in FIG. 7 has a Need Designation of "Rarely/Never" as made by the selected agency and a Need Designation of "Undecided/Unknown" made by the agency in row (FIG. 4).

FIG. 8 shows a screen shot of a GUI (Graphic User Interface) which allows for very simple data entry and a simple intuitive process to enter data into the CASM tool. The CAS data entry GUI shown in FIG. 8 allows a user to log in without selecting an agency. In FIG. 8, a user is allowed to: easily add/edit data for all agencies that the user is normally able to add/edit data for; streamlined data entry process, such as in a radio system section; ability to review the level of completion for a whole section or for a particular asset; ability to monitor the user's level of completeness while entering data, via a color-coded side menu shown in FIG. 8. A filter mechanism on all major tables allows a user to zero in on interested data, and a sorting option is allowed on all tables.

In the example shown in FIG. 8 for an add/edit radio system, a user assigns the radio system name and identifies the owning/responsible agency for the radio system name, either alphabetically or by jurisdiction hierarchy. The agency can be selected as primary or secondary/backup system, including the number of mobile/portable radios use on the system. The radio system definition shown in FIG. 8 can include primary manufacturer, system type (trunked/convention/both), model name; P25 compliancy, encryption protocol, and other definitions such as repeated/duplex, analog/digital, wideband/narrowband, voted, simulcast. Latitude/longitude data can also be selected, as shown in FIG. 8.

Figure 9:
FIG. 9 shows a data export feature.

FIG. 9 shows a data export feature. A data export capability allows users the ability to export data out of CASM for use in other applications. Data may be exported from the CASM database to tab separated files for use in, for example, MS Excel or in a custom application. The data export feature shown in FIG. 9 may be used to review, manipulate, or visualize the CASM data easily in the custom application or in the MS Excel application. In the example shown in FIG. 9, a user is exporting database information for Lake Tahoe, Calif. In FIG. 9, the user exports the Lake Tahoe information to all selected agencies, by simply clicking on the Export Data button.

FIG. 10 (which includes FIG. 10A and FIG. 10B) is a screen shot showing a CASM community forum feature. The forum feature allows users to freely share information (interact) via the internet about CASM or general public safety communication and interoperability issues with other CASM users across the country. All CASM users can have access to the CASM general forum shown in FIG. 10. Each state/urban area that uses CASM can have a private forum accessible only to users who have access to that state/urban area data.

In the example shown in FIG. 10, the CASM General forum can include announcements, frequently asked questions, training, general help, overall CASM enhancements, CASM usage, software bugs, and documentation, with number of topics/posts and last post indications. For illustrative purposes only, forums shown in FIG. 10 include Indiana, Lake Tahoe, Crater Lake, Ohio, National Capital region, and Michigan, again with topics/posts and last post indications.

It will be understood that many additional changes in the details, materials, steps and arrangement of parts, which have been herein described and illustrated to explain the nature of the invention, may be made by those skilled in the art within the principal and scope of the invention as expressed in the appended claims.

What is claimed is:

1. In a computer system, a method comprising:
   a) collecting agency data that identifies local, state, and federal entities in a geographic region;
   b) collecting communication asset data that identifies the communication equipment used by each entity in the geographic region;
   c) calculating interoperability data based upon the collected communication asset data, wherein the interoperability data represents the interoperability of the communication equipment used by emergency and first responders between the various entities in the geographic region, including prioritizing interoperability communications to provide a communication need vs ability analysis between the various agencies;
   d) storing the agency data, the communication asset data, and the interoperability data in a computer database;
   e) receiving a request from a user to display the agency data, the communication asset data, and the interoperability data for the geographic region; and
   f) displaying the agency data, the communication asset data, and the interoperability data for the geographic region to the user on a geo-spatial referenced map, including displaying the prioritized interoperability communications.

2. The method as in claim 1 comprising exporting the agency data, the communication asset data, and the interoperability data to allow for review, manipulation or visualization.

3. The method as in claim 1 comprising sharing the agency data, the communication asset data, and the interoperability data with other users.

4. The method as in claim 1 comprising graphically entering the agency data, the communication asset data, and the interoperability data without the selection of one of the agencies upon log-in.

5. The method of claim 1 including identifying interoperable gaps between the respective agencies.

6. The method of claim 1 including identifying interoperable gaps between the respective agencies prior to an emergency incident.

7. The method of claim 6 including making an analysis of highest needs and least ability to communicate between the respective agencies.

8. In a computer system, a method comprising:
   a) collecting agency data that identifies local, state, and federal entities in a geographic region;
   b) collecting communication asset data that identifies the communication equipment used by each entity in the geographic region;
   c) calculating interoperability data based upon the collected communication asset data, wherein the interoperability data represents the interoperability of the communication equipment used by emergency and first responders between the various entities in the geographic region, including prioritizing interoperability communications between the various agencies to provide a communication need vs ability analysis;
   d) storing the agency data, the communication asset data, and the interoperability data in a computer database;
   e) receiving a request from a user to display the agency data, the communication asset data, and the interoperability data for the geographic region;
   f) displaying the agency data, the communication asset data, and the interoperability data for the geographic region to the user on a geo-spatial reference map, including displaying the prioritized interoperability communications;
   g) exporting the agency data, the communication asset data, and the interoperability data to allow for review, manipulation or visualization;
   h) sharing the agency data, the communication asset data, and the interoperability data with other users; and
   i) graphically entering the agency data, the communication asset data, and the interoperability data without the selection of one of the agencies upon log-in.

9. The method of claim 8 including identifying interoperable gaps between the respective agencies.

10. The method of claim 8 including identifying interoperable gaps between the respective agencies prior to an emergency incident.

11. The method of claim 10 including making an analysis of highest needs and least ability to communicate between the respective agencies.

* * * * *